(12) United States Patent
Serabatir et al.

(10) Patent No.: US 10,655,865 B2
(45) Date of Patent: May 19, 2020

(54) HOUSEHOLD APPLIANCE CONTROL UNIT CONTROLLED BY MEANS OF AN IMAGE REFLECTED BY A PROJECTOR

(71) Applicant: ARCELIK ANONIM SIRKETI, Istanbul (TR)

(72) Inventors: Davut Ayhan Serabatir, Istanbul (TR); Ozgur Mutlu Oz, Istanbul (TR)

(73) Assignee: ARCELIK ANONIM SIRKETI, Istanbul (TR)

(*) Notice: Subject to any disclaimer, the term of this patent is extended or adjusted under 35 U.S.C. 154(b) by 0 days.

(21) Appl. No.: 16/072,479

(22) PCT Filed: Feb. 3, 2017

(86) PCT No.: PCT/EP2017/052363
§ 371 (c)(1),
(2) Date: Jul. 24, 2018

(87) PCT Pub. No.: WO2017/134213
PCT Pub. Date: Aug. 10, 2017

(65) Prior Publication Data
US 2018/0372331 A1  Dec. 27, 2018

(30) Foreign Application Priority Data
Feb. 5, 2016  (TR) ............... a 2016/01549

(51) Int. Cl.
*F24C 15/20* (2006.01)
*G02B 27/00* (2006.01)
(Continued)

(52) U.S. Cl.
CPC .......... *F24C 15/2021* (2013.01); *F24C 7/083* (2013.01); *G02B 27/0006* (2013.01); *H04N 9/3141* (2013.01)

(58) Field of Classification Search
CPC .............................. F24C 15/2021; F24C 7/083
(Continued)

(56) References Cited

U.S. PATENT DOCUMENTS 7,029,128 B2 * 4/2006 Nishio ................... G03B 21/26
349/112
2012/0320345 A1 * 12/2012 Kleinert .............. A47L 15/4293
353/98
(Continued)

FOREIGN PATENT DOCUMENTS

DE   102012103684 A1   10/2013
WO   2010135478 A2   11/2010
WO   2015078643 A1   6/2015

OTHER PUBLICATIONS

International search report and written opinion, dated Mar. 30, 2017, of International Application No. PCT/EP2017/052363; 8 pgs.

*Primary Examiner* — Christopher E Mahoney
(74) *Attorney, Agent, or Firm* — Kilpatrick Townsend & Stockton LLP

(57) ABSTRACT

The present invention relates to a household appliance control unit comprising a casing and a projector that is placed in the casing, that transmits images preloaded by the producer to a surface and is suitable for enabling the user to input data via the image transmitted and enabling one or more than one household appliance to be controlled according to the data input.

14 Claims, 3 Drawing Sheets

Figure 1:
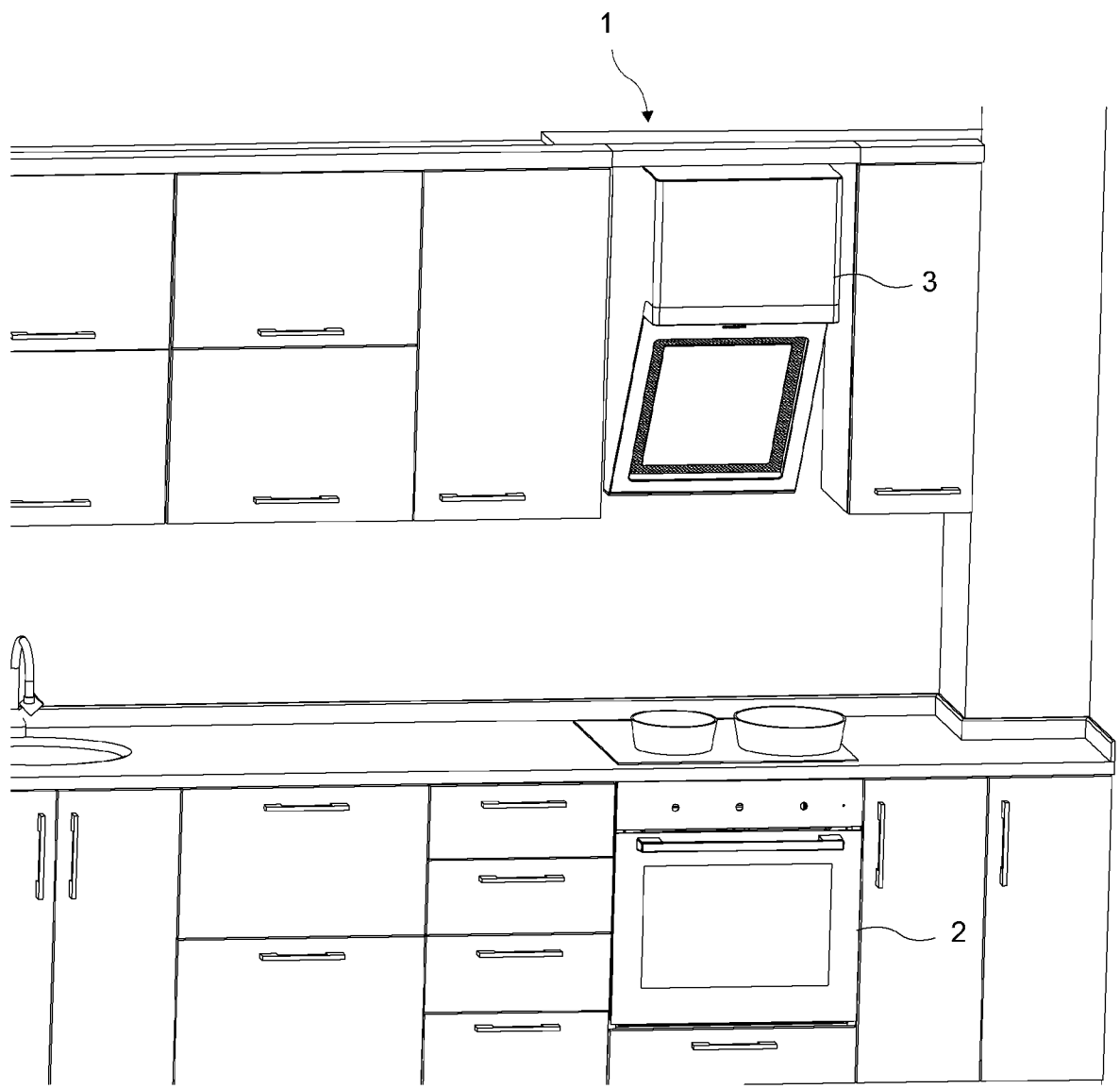

(51) Int. Cl.
*H04N 9/31* (2006.01)
*F24C 7/08* (2006.01)

(58) Field of Classification Search
USPC .................................................. 359/507, 509
See application file for complete search history.

(56) References Cited

U.S. PATENT DOCUMENTS

2018/0232105 A1* 8/2018 Hatipoglu ............ F24C 15/2021
2018/0238555 A1* 8/2018 Serabatir ................. F24C 7/082
2018/0363922 A1* 12/2018 Serabatir ............. F24C 15/2021

* cited by examiner

HOUSEHOLD APPLIANCE CONTROL UNIT CONTROLLED BY MEANS OF AN IMAGE REFLECTED BY A PROJECTOR

RELATED APPLICATIONS

This application is a U.S. National Phase of International Application No. PCT/EP2017/052363, filed Feb. 3, 2017, claiming priority to Turkish Patent Application No. 2016/01549, filed Feb. 5, 2016, contents of which are hereby incorporated by reference in their entirety.

The present invention relates to a household appliance control unit the operation of which is controlled by means of a projector that reflects an image predetermined by the producer for controlling the household appliance on a surface and by means of a sensor that detects the control signal on the area scanned by the projector.

Nowadays, household appliances can be controlled in a wired or wireless manner by detecting the data input by the user via the image reflected by the projectors on a surface. Especially in cooker and exhaust hood embodiments, the projector is placed inside the exhaust hood; however, due to the operation of the cooker, impurities such as oil, moisture, etc. in the environment stick to and accumulate on the glass in front of the projector, consequently beams emanating from the projector cannot reach the surface on which the image is intended to be reflected or the quality of the image is impaired.

In the state of the art International Patent Application No. WO2010135478, household appliances are disclosed, that are controlled from the image projected by the projector.

In the state of the art International Patent Application No. WO2015078643, a projector placed on an exhaust hood and a cooker controlled via an image reflected by the projector are disclosed.

The aim of the present invention is the realization of a casing comprising a protector that protects the plate in front of the projector against dirt in the environment.

The household appliance control unit realized in order to attain the aim of the present invention, explicated in the first claim and the respective claims thereof, comprises a projector placed into a casing, a plate that is disposed in front of the projector and a protector that prevents the impurities in the environment from sticking to and accumulating on the plate. Thus, the impurities in the environment such as dirt, moisture, dust, oil, etc. are prevented from sticking to and accumulating on the plate. By means of the protector, the image projected by the projector passed through the plate without refracting and is enabled to be directly transferred onto the surface on which the said image is desired to be projected.

In an embodiment of the present invention, the protector is an oleophobic coating coated onto the plate. Thus, the impurities in the environment are prevented from sticking to and accumulating on the plate.

In an embodiment of the present invention, the protector is a mechanism creating an air curtain. Thus, by creating an air curtain between the environment and the plate, the impurities in the environment are prevented from reaching the plate.

In an embodiment of the present invention, the household appliance control unit controls a cooker and is placed inside an exhaust hood. The project is disposed into the exhaust hood mounted above the cooker. In this embodiment, when the cooker is operated, the exhaust hood and the mechanism are also operated. Thus, by means of the air curtain the impurities such as oil, moisture, etc. generated due to the operation of the household appliance are prevented from reaching the plate and accumulating on the surface of the plate.

By means of the present invention, while the materials such as boiled water and oil vapor on the cooker are sucked and discharged by the exhaust hood during the cooking process, the said materials are prevented from reaching the plate by the protector so as to not block the light projected by the projector and to not disrupt the quality of the light projected by the projector.

A household appliance control unit realized in order to attain the aim of the present invention is illustrated in the attached figures, where:

FIG. 1—is the general view of a household appliance control unit.

Figure 2:
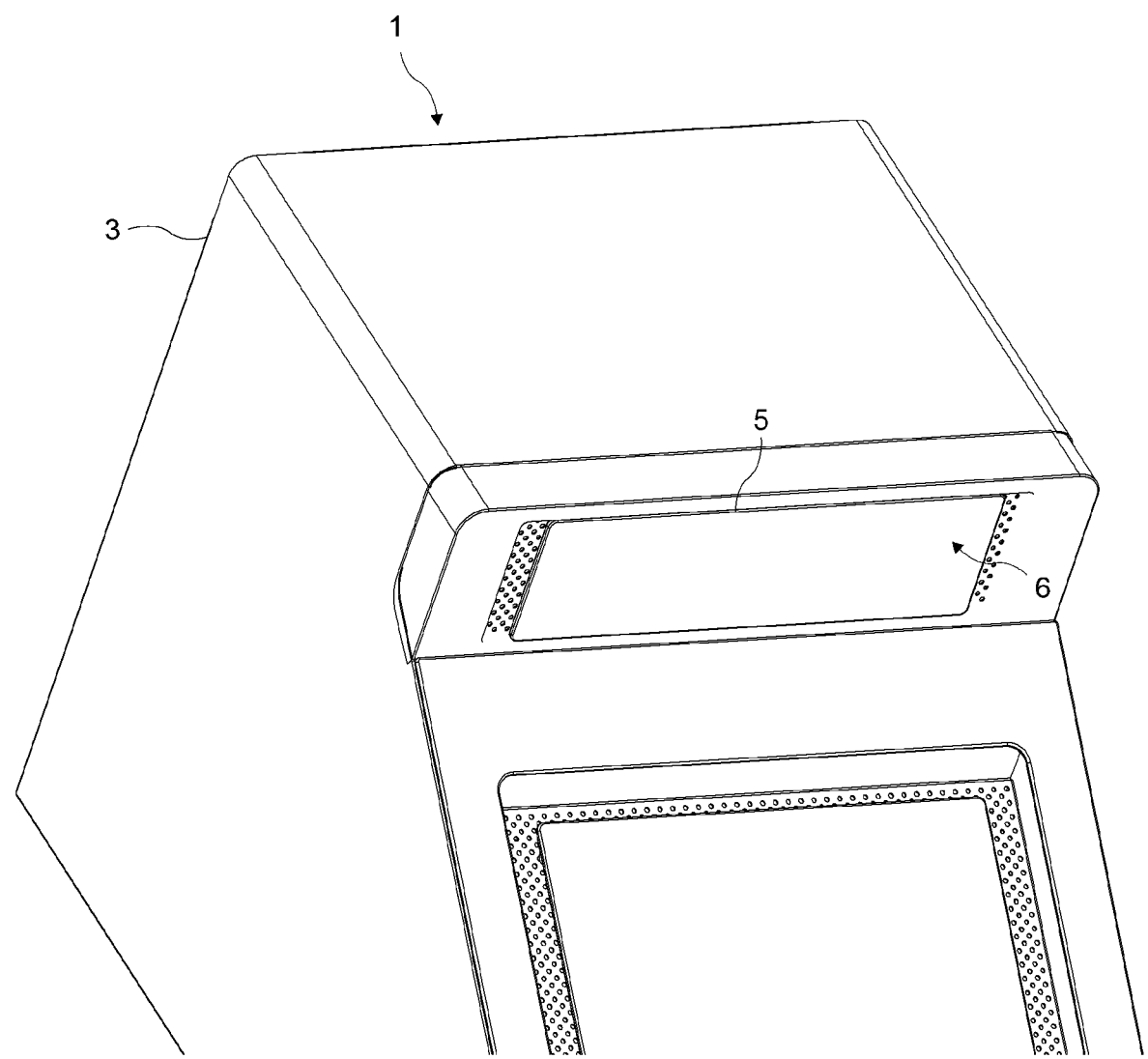

FIG. 2—is the view of the casing and the plate.

Figure 3:
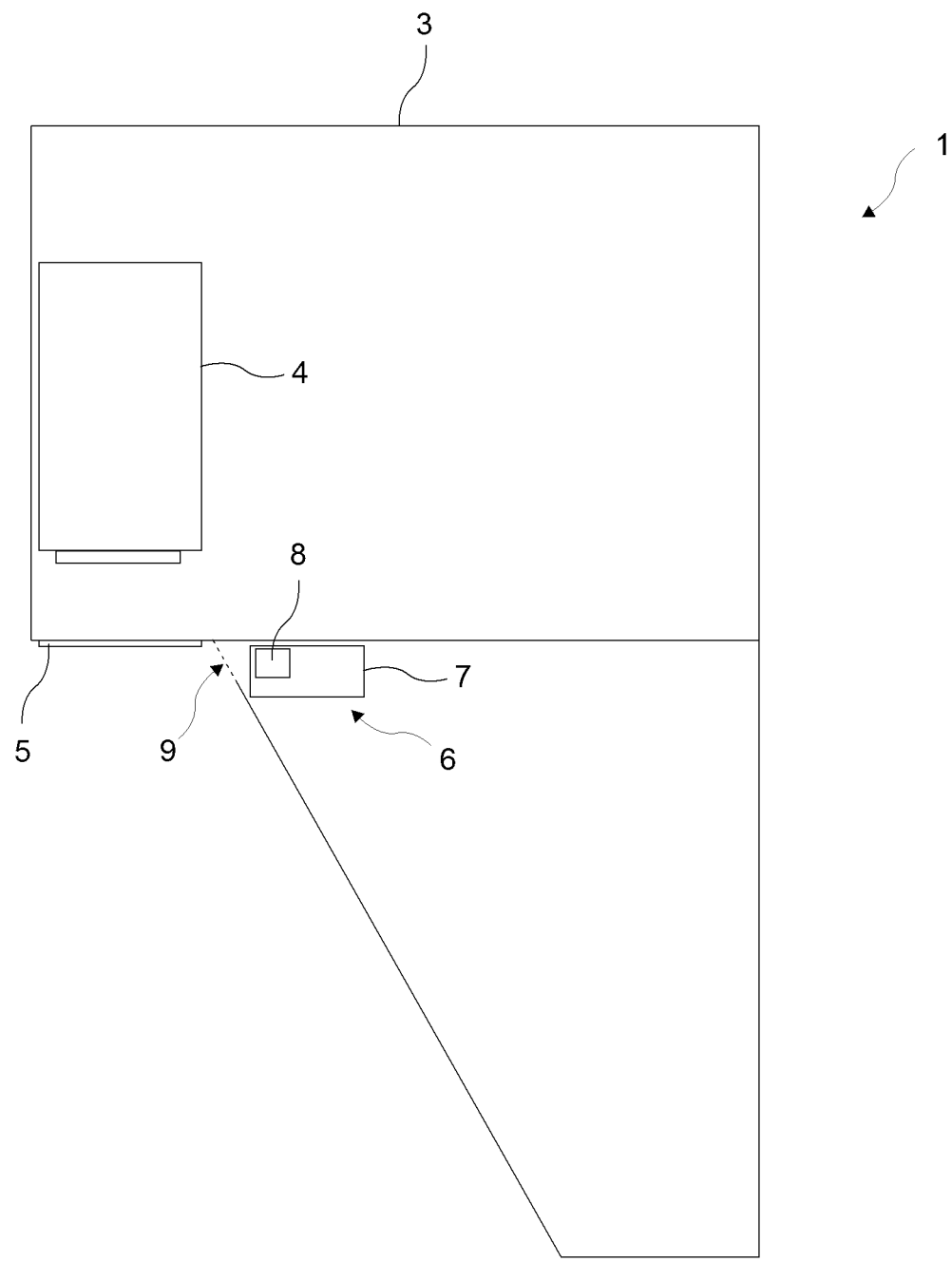

FIG. 3—is the sideways view of the casing, the projector and the protector.

The elements illustrated in the figures are numbered as follows:

1. Household appliance control unit
2. Household appliance
3. Casing
4. Projector
5. Plate
6. Protector
7. Mechanism
8. Fan
9. Hole The household appliance control unit (1) comprises a casing (3); a projector (4) that is placed in the casing (3), that transmits images preloaded by the producer to a surface and is suitable for enabling the user to input data via the image transmitted and enabling one or more than one household appliance (2) to be controlled according to the data input, and a transparent plate (5) that is disposed between the projector (4) and the surface whereon the image is projected, and a protector (6) that prevents the impurities in the environment from sticking to the plate (5) (FIG. 1).

The protector (6) prevents the impurities such as dust, oil, moisture, etc. generated due to the operation of the household appliance (2) or present in the environment wherein the projector (4) is disposed from being sticking to and accumulating on the plate (5) that is disposed in front of the projector (4) so that the image projected by the projector (4) disposed in the casing (3) is not prevented from reaching the surface. Thus, the light projected by the projector (4) reaches the surface to which the same is desired to be transferred without any obstacle that disrupts the quality of the image or that prevents the passage of the light, thus without any disruption of the quality.

In an embodiment of the present invention, the plate (5) is glass.

In another embodiment of the present invention, the protector (6) is a coating coated onto the plate (5) The coating is preferably an oleophobic coating. The light projected by the projector (4) passes and is transferred through the plate (5) without any reflection or refraction since the impurities in the environment such as dust, oil, moisture, etc. are prevented from gripping on, sticking to and accumulating on the plate (5) by means of the coating (FIG. 2).

In another embodiment of the present invention, the protector (6) comprises a mechanism (7) that blows air onto the plate (5) so as to prevent the impurities in the environment such as dust, dirt, oil, moisture etc. from reaching the plate (5). The mechanism (7) blows air onto the plate (5) so as to create an air curtain between the plate (5) and the environment, thus preventing the impurities in the environment such as dust, dirt, oil, moisture etc. from reaching the plate (5) and preventing the said impurities from sticking to the plate (5). Consequently, the image projected from the projector (4) is enabled to pass through the plate (5) so as to be transmitted to the surface without refracting or reflecting. In a version of this embodiment, the mechanism (7) comprises a fan (8) and at least one hole (9) that enables the air blown by the fan (8) to be directed onto the plate (5). In another embodiment of the present invention, the mechanism (7) blows air parallel to the surface of the plate (5) (FIG. 3).

In the preferred embodiment of the present invention, a cooking device is controlled by means of a household appliance control unit (1) as explicated in the foregoing embodiments. In the preferred embodiment, the cooking device is a countertop cooker. In another version of this embodiment of the present invention, the household appliance control unit (1) is placed inside an exhaust hood. In this embodiment of the present invention, the exhaust hood is mounted above the countertop cooker so that a distance remains between the exhaust hood and the countertop cooker. In this embodiment, the projector (4) disposed in the casing (3) transmits the image on the household appliance (2) or on the surface where the same is placed. In this embodiment, any impurities such as oil, steam, moisture, etc. generated due to the meal cooked on the cooker reach the plate (5) in front of the projector (4) placed in the exhaust hood while being sucked by the exhaust hood. By means of the present invention, the said impurities are prevented from reaching the plate (5) or accumulating on the plate (5) and the image projected by the projector (4) is enabled to pass through the plate so as to be transmitted onto the desired surface without being refracted or reflected.

The invention claimed is:

1. A household appliance control unit comprising:
   a casing,
   a projector placed in the casing, that transmits preloaded images to a surface and is suitable for receiving data input via a transmitted image and enabling one or more than one household appliance to be controlled according to the data input,
   a transparent plate disposed between the projector and the surface whereon the image is projected, and
   a protector including an oleophobic coating coated on the plate to prevent impurities in environment from sticking to the plate.

2. The household appliance control unit as in claim 1, wherein the plate is glass.

3. The household appliance control unit as in claim 1, wherein the protector further includes a mechanism that blows air onto the plate so as to prevent the impurities in the environment such as dust, dirt, oil, moisture etc. from reaching the plate.

4. The household appliance control unit as in claim 3, wherein the mechanism further includes a fan and at least one hole that enables the air blown by the fan to be directed onto the plate.

5. The household appliance control unit as in claim 3, wherein the mechanism blows air parallel to the surface of the plate.

6. A cooking device controlled by a household appliance control unit as in claim 1.

7. An exhaust hood comprising a household appliance control unit as in claim 1.

8. A household appliance control unit comprising:
   a casing,
   a projector placed in the casing, that transmits preloaded images to a surface and is suitable for receiving data input via a transmitted image and enabling one or more than one household appliance to be controlled according to the data input,
   a transparent plate disposed between the projector and the surface whereon the image is projected, and
   a protector that prevents impurities in environment from sticking to the plate, wherein the protector includes:
      a mechanism that blows air onto the plate so as to prevent the impurities in the environment from reaching the plate.

9. The household appliance control unit as in claim 8, wherein the plate is glass.

10. The household appliance control unit as in claim 8, wherein the protector includes a coating coated onto the plate.

11. The household appliance control unit as in claim 10, wherein the coating is an oleophobic coating.

12. The household appliance control unit as in claim 8, wherein the mechanism blows air parallel to the surface of the plate.

13. A cooking device controlled by a household appliance control unit as in claim 8.

14. An exhaust hood comprising a household appliance control unit as in claim 8.

* * * * *